Oct. 17, 1950 — R. G. GOLDINGER — 2,526,346
ACCIDENT VALVE
Filed Dec. 12, 1945
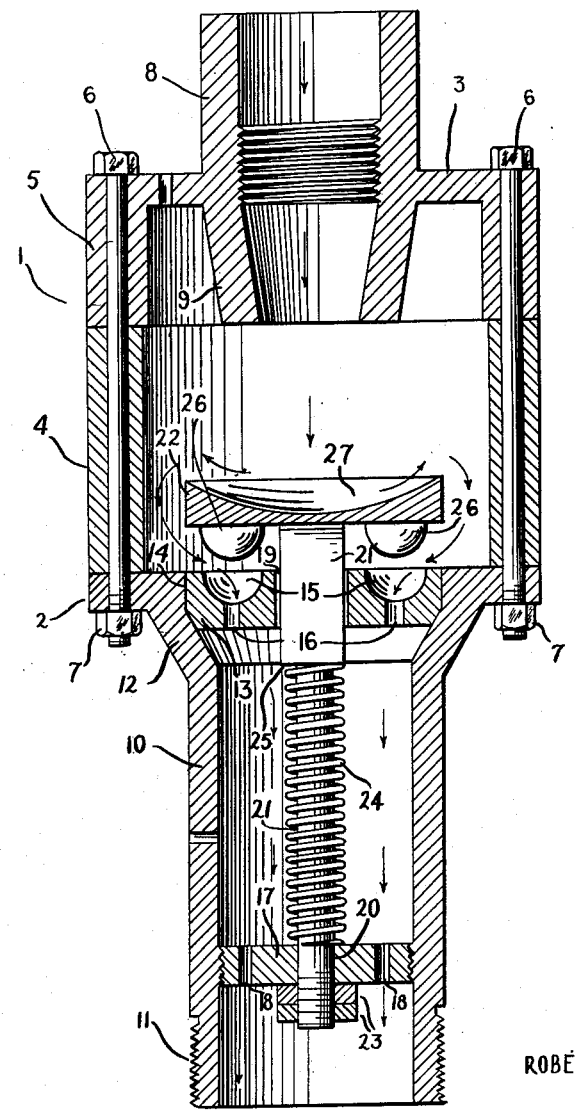
INVENTOR.
ROBERT G. GOLDINGER
BY Victor J. Evans & Co.
ATTORNEYS Patented Oct. 17, 1950

2,526,346

UNITED STATES PATENT OFFICE 2,526,346

ACCIDENT VALVE

Robert Glenn Goldinger, Codell, Kans.

Application December 12, 1945, Serial No. 634,486

1 Claim. (Cl. 251—114)

This invention relates to a valve and it is one object of the invention to provide a valve adapted to be installed in a pipe line through which gas, oil, or water flows and serve to prevent flow of the fluid from the pipe line in case the pipe line becomes broken at a point between the valve and the place to which the fluid is being delivered.

Another object of the invention is to provide a valve of such construction that it may be set for any pre-determined pressure and thus allow fluid under the pre-determined pressure to flow freely through the valve, increased pressure caused when a break occurs serving to close the valve and shut off flow of the fluid through the same.

Another object of the invention is to provide a valve consisting of a plurality of parts which may be easily and quickly assembled to form the complete valve.

Another object of the invention is to provide a valve of this character of such construction that fluid entering the same will be directed as a jet towards a concaved surface of a valve disc and thus centered relative to the valve disc so that the disc will be quickly moved to a closed position when subjected to pressure greater than the valve is set for.

The invention is illustrated in the accompanying drawings wherein the figure shows the improved valve in longitudinal section.

This improved valve has a hollow body or casing 1 consisting of heads 2 and 3 and a spacer 4, the head 3 being formed with an annular skirt 5 and the spacer 4 being disposed between this skirt and the head 2 and bolts 6 being passed through aligned openings formed through the heads and the spacer and having their nuts 7 tightened to hold the parts in tight fitting engagement with each other. A coupling 8 extends outwardly from the head 3 for engagement with a supply pipe and in alignment with this coupling there has been provided an inwardly extending tapered nozzle 9 so that the fluid from the supply pipe will be discharged as a jet axially of the valve casing.

The head 2 is formed integral with an outlet tube or neck 10 which has its outer end externally threaded, as shown at 11, for connection with a pipe through which the gas or other fluid is to pass to a place of use. The inner end portion 12 of the tube 10 is tapered so that the disc 13 which is fitted into the opening 14 of head 2 will be firmly seated and prevented from moving outwardly beyond the position shown in the drawing. Cup-shaped recesses or seats 15 are formed in the inner face of the disc in spaced relation to each other circumferentially thereof and from these seats lead ports 16 through which the fluid flows from the casing into the outlet pipe or tube 10 and it will be understood that any desired number of seats 15 and ports 16 may be provided consistent with the size of the disc. A second disc 17 is screwed into the tube 10 for longitudinal adjustment therein and through this disc are formed a number of ports 18 through which the fluid passes. Center openings 19 and 20 are formed through discs 13 and 17 to slidably receive the stem 21 of a valve head or disc 22 disposed within the casing 1 and it should be noted that the opening 19 and the portion 21' of the stem 21 passing through it are square to prevent the stem from turning in the opening 19. For the remainder of its length the stem is of reduced diameter and circular in cross section and its outer end is threaded and carries nuts 23. A spring 24 surrounds the stem 21 between the disc and the shoulder 25 at the end of the squared portion of the stem and urges the valve head 22 away from the disc 13 to its open position. By adjusting the position of the disc 17 in the tube 10, the pressure required to move the valve head towards the disc 13 to a closed position in which its hemispherical bosses 26 enter the seats 15 and close the valve may be controlled. The surface 27 of the valve head 22 confronting the nozzle 9 is of concaved cup-shaped formation and when the jet of fluid strikes this surface, it will be centered relative to the head 22 and the stem 21 and its force will tend to shift the valve head towards a closed position. By setting the disc 17 to tension the spring 24 for resisting a pre-determined pressure, the valve head will be held open and the the fluid may flow through the ports 16 into pipe or tube 10 and through the ports 18 into a distributing pipe line connected with the threaded line or for some other reason the fluid flows with increased pressure through the casing 1 its force will shift the valve head towards disc 13 and the bosses 26 will enter the seats 15 and shut off flow of fluid through the tube or neck 10. As soon as the break in the distributing line is fixed pressure will equalize itself in the casing and the neck or tube and the valve head 22 will be restored to its open position by action of the spring 24. It will thus be seen that the valve head will normally remain open, but will be automatically closed by pressure of the jet striking the cupped face of the valve head when a break occurs.

Since elements forming the casing are held together by the bolts 6, the casing may be easily taken apart for cleaning the valve or making replacement of parts when necessary.

What is claimed is:

In a valve device, a casing having a front head and a rear head, a spacer separating the heads, the rear head being formed with an annular skirt and bolts passing through the spacer and the front and rear heads and the annular skirt of said rear head to retain said heads and said spacer in fixed relation to each other, a coupling extending outwardly from the rear head for attachment to a supply pipe, the inner end of the coupling having a tapered nozzle to cause fluid to be discharged axially of the casing, an outlet neck formed integrally with the front head and having a tapered portion, a first disc fitted in the tapered portion at the connection with the front head of the neck, said first disk having cup-shaped recesses and ports therethrough communicating with the recesses, a second disc screwed into the neck for longitudinal adjustment and having ports therein, a valve stem passing through the two discs, the portion of the rod passing through the first disc having means to prevent rotation of the rod, a valve head attached to the stem and a concave surface to receive fluid from the nozzle, said valve head having semi-spherical projections adapted to rest in the recesses in the first disc, and spring means to normally hold the valve head away from the first disc.

ROBERT GLENN GOLDINGER.

REFERENCES CITED

The following references are of record in the file of this patent:

UNITED STATES PATENTS

| Number | Name | Date |
|---|---|---|
| 504,838 | Jeannotte | Sept. 12, 1893 |
| 1,001,324 | Thompson | Aug. 22, 1911 |
| 1,001,510 | Curbey | Aug. 22, 1911 |
| 1,326,938 | Knudsen | Jan. 6, 1920 |
| 1,587,080 | Marcelli | June 1, 1926 |
| 1,671,140 | Wilson | May 29, 1928 |
| 2,002,672 | Melott | May 28, 1935 |
| 2,151,442 | Roberts | Mar. 21, 1939 |
| 2,165,649 | Parsons | July 11, 1939 |